United States Patent [19]

Galloway et al.

[11] Patent Number: 4,458,306
[45] Date of Patent: Jul. 3, 1984

[54] HIGH AMPLITUDE, PULSED CURRENT PLATING SYSTEM

[75] Inventors: James H. Galloway, New Baltimore; Carmelo J. Amato, Cupertino, both of Calif.

[73] Assignee: Hooker Chemicals & Plastics Corporation, Warren, Mich.

[21] Appl. No.: 366,641

[22] Filed: Apr. 8, 1982

[51] Int. Cl.$^3$ .................. H02M 3/315; H02P 13/18
[52] U.S. Cl. ........................... 363/27; 204/194; 363/37
[58] Field of Search ............. 204/194; 307/89, 90, 307/91; 333/12; 363/34, 35, 37, 38, 41, 27

[56] References Cited

U.S. PATENT DOCUMENTS

| | | | |
|---|---|---|---|
| 221,170 | 11/1879 | Holmes et al. | 174/34 |
| 3,942,090 | 3/1976 | Matthes et al. | 363/37 |
| 3,995,174 | 11/1976 | Zrudsky | 363/124 X |
| 4,128,868 | 12/1978 | Gamble | 363/26 |
| 4,301,428 | 11/1981 | Mayer | 333/12 |

FOREIGN PATENT DOCUMENTS 37221 3/1979 Japan ........................... 363/27

*Primary Examiner*—William M. Shoop
*Attorney, Agent, or Firm*—Harness, Dickey & Pierce

[57] ABSTRACT

An industrial plating system operative from a relatively high voltage, 60 Hz, three phase a-c source for providing a relatively low voltage pulsed d-c for delivering currents above around 1,000 amperes to plating load and including amplitudes of 3,000 to 5,000 amperes, and including a controlled rectifier operative with the a-c source to provide a rectified d-c output voltage of a preselected high amplitude, an inverter operative with the controlled rectifier and situated at substantially the same physical location for providing a pulsed a-c output of a preselected width and a-c frequency, the a-c frequency being from around 300 Hz to 3000 Hz, a high frequency rectifier operative with the inverter for providing plating loads with a rectified pulsed d-c having d-c amplitude and a preselected pulsed d-c frequency, the pulsed d-c frequency being greater than the preselected a-c frequency, the high frequency rectifier having a high frequency step down power transformer and a pair of high speed diodes operative in plating systems where the pulsed a-c has a peak amplitude of around 150 volts to 550 volts to provide the pulsed d-c with an amplitude of around 2 volts to 50 volts, and an a-c bus having lines of opposite polarity connecting the pulsed a-c to the input of the high frequency rectifier the a-c bus having a gauge permitting the lines of opposite polarity to be twisted together to minimize inductive and resistive effects of the a-c bus.

10 Claims, 1 Drawing Figure

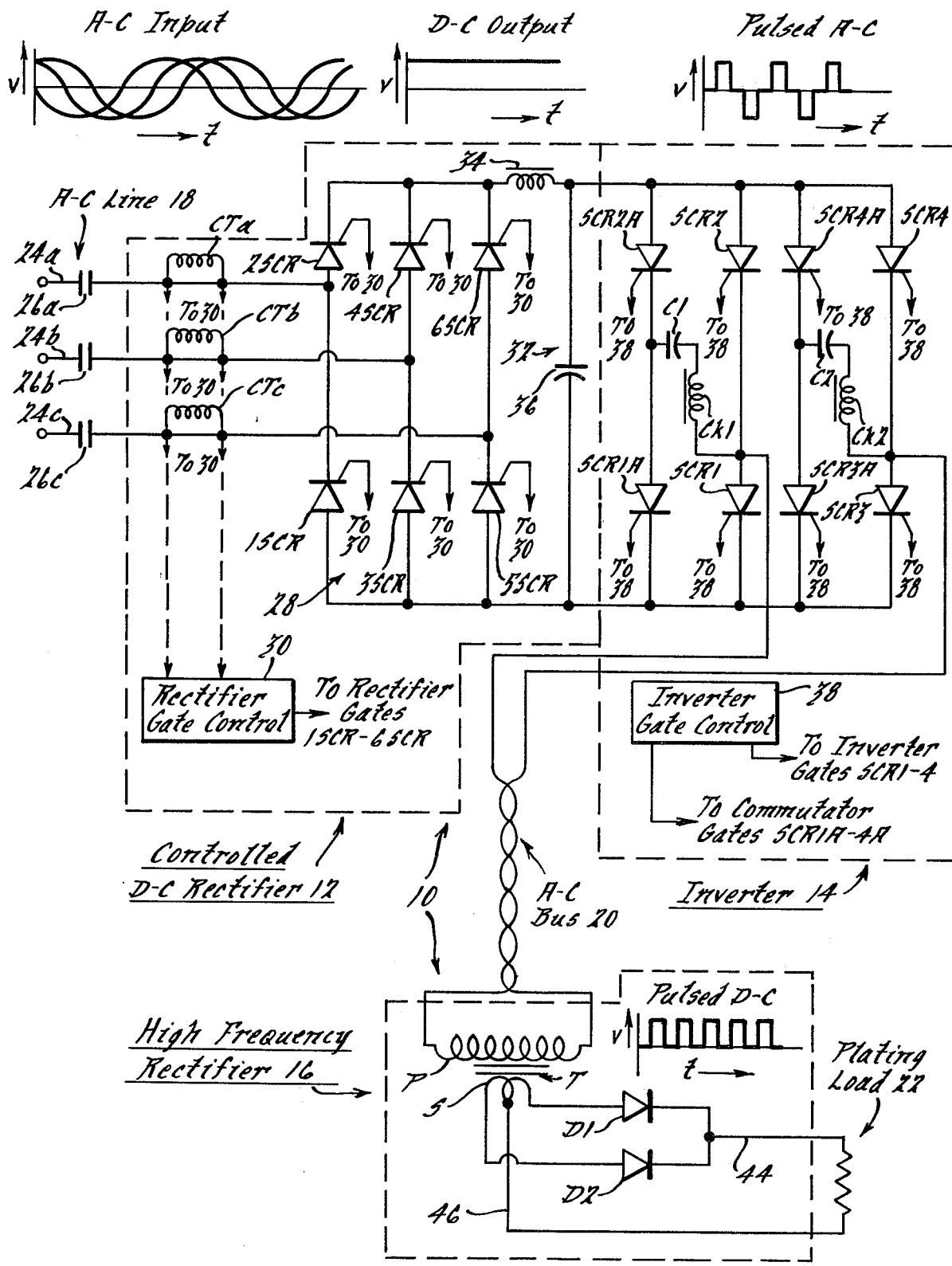

HIGH AMPLITUDE, PULSED CURRENT PLATING SYSTEM

BACKGROUND—SUMMARY OF THE INVENTION

The present invention relates to high amplitude pulsed current plating systems and more particularly to a system for the transmission of high voltage, pulsed power for high amplitude, pulsed current plating applications.

In high amplitude pulsed current, industrial plating applications the inductance of the buswork can limit the rates of effective current change. In addition, in order to reduce the power line loss (i.e. $I^2R$), the buswork lines must be heavy gauge to minimize resistance. At the same time, while twisting of the buswork lines could be effective to reduce the net inductive effect, this is difficult if not practically impossible where heavy gauge buswork lines are used. Note also that heavy gauge lines are quite costly making long runs very expensive. Because of the high magnitudes of currents involved and the inductive effects of the buswork and its effect on effective switching speeds, location of the pulse generation equipment relative to the load is significant. Thus in conventional systems the pulse generation equipment must be located very close to the load. In such conventional systems an a-c input is converted to low voltage d-c which is transmitted to the load via a d-c bus and power transistors are used to switch or invert current from the d-c bus to the desired pulsed d-c output. For the reasons given above, this can be cumbersome and inefficient in high current applications, i.e. above around 1,000 amps; currents of 3,000 to 5,000 amperes are common in industrial plating applications.

In the present invention, an a-c input is converted to d-c and at the same proximate location is inverted to a higher frequency, pulse width modulated a-c voltage. The a-c pulsed voltage is then transmitted via an a-c bus to the load where it is converted to a pulsed d-c. This provides an efficient system for high current, pulsed plating applications.

Thus it is an object of the present invention to provide a novel system for providing pulsed power for high current pulsed d-c plating applications.

It is another general object of the present invention to provide a novel system for providing pulsed power for high current pulsed d-c applications.

Other objects, features, and advantages of the present invention will become apparent from the subsequent description and the appended claims, taken in conjunction with the accompanying drawing which is a partial electrical schematic and block diagram of the system of the present invention.

Looking now to the drawing, the high current pulse plating system of the present invention is generally indicated by the numeral 10 and includes a Controlled D-C Rectifier 12, an Inverter 14, and a High Frequency Rectifier 16.

In general, the D-C Rectifier 12 receives an a-c input of a relatively high voltage from a three phase A-C line 18 and provides a relatively high voltage d-c output to the input of Inverter 14 which is substantially at the same physical location as Rectifier 12. The Inverter 14 provides a single phase pulsed a-c output to an A-C Bus 20. The A-C Bus 20 transmits the pulsed a-c output to the input of the H. F. Rectifier 16 located at the plating Load 22. The frequency of the pulsed a-c from Inverter 14 is higher than the 60 Hz which is at the a-c line 18 and is selected to be that frequency which will provide the desired frequency for the pulsed d-c at the output of H. F. Rectifier 16 for Load 22. At the same time the inductive effect of A-C Bus 20 on this higher frequency will be substantially less than on a 60 Hz voltage. Also since it is a high voltage a-c which is being transmitted on the bus instead of a low voltage d-c the power losses will be reduced. The Inverter 14, by pulse width modulation will provide the pulsed a-c to have the pulse width desired for the pulsed d-c output from H. F. Rectifier 16.

Looking more particularly to the drawing the source of three phase power for a-c line 18 is such as readily available from an electric utility and in one form of the invention can be 480 volts, 60 Hz a-c. The a-c line 18 comprises three conductors 24a, 24b and 24c which receive the three phase power from the source and transmit the a-c from the source to the D-C Rectifier 12 via circuit breaker contacts 26a, 26b and 26c, respectively. Contacts 26a–c provide means for connecting and disconnecting the a-c line 18 from the D-C Rectifier 12.

D-C Rectifier 12 comprises a conventional three phase full wave rectifier bridge 28. The bridge 28 includes a plurality of unidirectional controlled conduction devices 1SCR–6SCR; conductor 24a is connected between 1SCR and 2SCR; conductor 24b is connected between 3SCR and 4SCR; and conductor 24c is connected between 5SCR and 6SCR. Current transformers CTa, CTb and CTc can provide gate signals to devices 1SCR–6SCR via a rectifier gate control network 30. The d-c output from bridge 28 is smoothed via a filter circuit 32 comprising a series connected filter choke 34 and a parallely connected filter capacitor 36. The D-C Rectifier 12, including the bridge 28, gate control 30, and filter 32 can be ones known to those skilled in the art and hence the details thereof have been omitted for purposes of simplicity. The gate control 30 is set to provide a desired, known amplitude of d-c to Inverter 14.

The Inverter 14 operates upon the d-c voltage from Rectifier 12 to provide a pulsed single phase a-c output. This is accomplished via a plurality of controlled conduction devices SCR1–SCR4. The gates of SCR1–SCR4 are connected to Inverter Gate Control 38. Each of devices SCR1–SCR4 is connected to an appropriate commutating circuit including controlled conduction devices SCR1A–SCR4A, respectively. The commutating circuits also include commutation capacitors C1 and C2 and commutation chokes Ck1 and Ck2. Thus capacitor C1 and choke Ck1 connect commutation devices SCR1A and SCR2A to devices SCR1 and SCR2 and capacitors C2 and choke Ck2 connect commutation devices SCR3A and SCR4A to devices SCR3 and SCR4. The gates of SCR1A–SCR4A are also connected to Inverter Gate Control 38. In operation of the pulse plating system 10, Inverter 14 is set to provide a pulsed, single phase a-c output at conductors 40 and 42. For pulsed plating applications, the Inverter Gate Control 38 provides the pulsed a-c to be of a frequency greater than the 60 Hz of the source and this can be in the range of from around 300 Hz to around 3000 Hz. The Inverter 14 is pulse width modulated via Inverter Gate Control 38 to provide the desired pulse width for the known plating application. All of the above circuit components of Inverter 14, including the commutating circuitry and Inverter Gate Control 38, are of types well known to one skilled in the art and hence some details thereof have been omitted for purposes of simplicity.

Other and similar types of control circuits can be seen from the following U.S. Pat. Nos.: 3,622,804, to Mitchell, Jr., issued Nov. 23, 1971; 3,590,323, to Mapham, issued June 29, 1971; 3,648,078, to Galloway, issued Mar. 7, 1972; 3,978,394, to Quayle, issued Aug. 31, 1976; and 4,215,394, to Galloway et al, issued July 29, 1980.

Note that the pulsed a-c output at conductors 40 and 42 is at a frequency which is one half of the desired frequency of the pulsed d-c for the Load 22. This a-c output is transmitted to the locations of the various loads such as Load 22 via the A-C Bus 20. In industrial pulse plating applications the length of the A-C Bus 20 can be in a range of from around 10 feet to around 100 feet. As previously noted, however, the Rectifier 12 and Inverter 14 are substantially at the same physical location obviating the need for any significant length of interconnecting transmission line. In the present invention, the pulsed a-c output is transmitted via the A-C Bus 20 to the H. F. Rectifier 16 located at the Load 22. Since the A-C Bus 20 is transmitting voltages of relatively high magnitudes and currents of selectively low magnitudes it can be of a smaller gauge whereby the lines of opposite polarity can be twisted together (as shown in the drawing) to further minimize inductive effects.

Thus the A-C Bus 20 is connected to the primary winding P of a high frequency step down power transformer T in the H. F. Rectifier 16. Opposite sides of the secondary winding S of transformer T are connected to one of the ends of a pair of high speed diodes D1 and D2. Diodes D1 and D2, can be of the Shottky type, and have their opposite ends connected together to define a rectifier circuit. The commonly connected ends of diodes D1 and D2 are connected to one end of Load 22 via conductor 44 while the opposite end of Load 22 is connected to secondary S via a center tap conductor 46. Thus pulsed d-c at twice the frequency of the pulsed a-c will be transmitted to the Load 22. The stepdown transformer T will reduce the pulsed a-c voltage from a peak amplitude in a range of from around 150 to around 550 volts to the pulsed d-c voltage of an amplitude in a range of from around 2 to around 50 volts. The H. F. Rectifier 16 is located proximate plating load 22, whereby a transmission line or bus of minimal length is required. Thus the vast majority of distance for power transmission from Rectifier 12 to Load 22 will be covered by the A-C Bus 20, resulting in the efficiencies previously discussed. Note that multiple transformer and diode assemblies (such as T, D1, D2) can be driven by Inverter 14 permitting multiple low inductance feed to multiple plating tank loads.

Thus the system of the present invention provides an efficient structure for the provision of pulsed d-c for applications such as pulsed plating where the load current can be of a magnitude in excess of around 1,000 amperes.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In an industrial plating system providing from a relatively high voltage, 60 Hz, three phase a-c source a relatively low voltage pulsed d-c delivering a current having an amplitude in excess of around 1,000 amperes to a plating load, the invention comprising: controlled rectifier means electrically connected to the a-c source for providing therefrom a rectified d-c output voltage of a preselected high amplitude, inverter means electrically connected to said controlled rectifier means and situated at substantially the same physical location for providing pulsed a-c of a preselected width and preselected a-c frequency, with said preselected a-c frequency being in a range of from around 300 HZ to around 3000 HZ, high frequency rectifier means electrically connected to said inverter means for providing to the plating load from said pulsed a-c a rectified pulsed d-c having a preselected d-c amplitude and a preselected pulsed d-c frequency, said pulsed d-c frequency being twice that of said preselected a-c frequency, said high frequency rectifier means comprising a high frequency step down power transformer and a pair of high speed diodes such that in a plating system where said pulsed a-c has a peak amplitude in a range of from around 150 volts to around 550 volts said power transformer and said high speed diodes provide said pulsed d-c having an amplitude in a range of from around 2 volts to around 50 volts, an a-c bus having lines of opposite polarity electrically transmitting said pulsed a-c to the input of said high frequency rectifier means with said a-c bus being of a gauge permitting twisting of said lines of opposite polarity whereby the inductive and resistive effects of said a-c bus can be minimized.

2. The system of claim 1 with said a-c bus having a length in a range of from around 10 feet to around 100 feet.

3. The system of claim 1 for delivering the pulsed d-c having a typical current amplitude in a range of around 3,000 to around 5,000 amperes.

4. In an industrial plating system providing from a relatively high voltage a-c source a relatively low voltage pulsed d-c delivering a current having an amplitude in excess of around 1,000 amperes to a plating load, the invention comprising: controlled rectifier means electrically connected to the a-c source for providing therefrom a rectified d-c output voltage of a preselected high amplitude, inverter means electrically connected to said controlled rectifier means and situated at substantially the same physical location for providing pulsed a-c of a preselected width and preselected a-c frequency, with said preselected a-c frequency being in a range of from around 300 Hz to around 3000 Hz high frequency rectifier means located at the plating load and electrically connected to said inverter means for providing to the plating load from said pulsed a-c a rectified pulsed d-c having a preselected d-c amplitude and a preselected pulsed d-c frequency, said pulsed d-c frequency being greater than that of said preselected a-c frequency, said high frequency rectifier means comprising a high frequency step down power transformer and a pair of high speed diodes, said power transformer and said high speed diodes providing said pulsed d-c with an amplitude in a range of from around 2 volts to around 50 volts, an a-c bus electrically transmitting said pulsed a-c to the input of said high frequency rectifier means whereby the inductive and resistive effects of said a-c bus are minimized.

5. In an industrial plating system providing from a relatively high voltage, a-c source a relatively low voltage pulsed d-c delivering a current having an amplitude in excess of around 1,000 amperes to a plating load, the invention comprising: controlled rectifier means electrically connected to the a-c source for providing therefrom a rectified d-c output voltage of a preselected high amplitude, inverter means electrically connected to said controlled rectifier means and situated at substantially the same physical location for providing pulsed a-c of a preselected width and preselected a-c frequency, with said preselected a-c frequency being greater than that of the a-c source, high frequency rectifier means located at the plating load and electrically connected to said inverter means for providing to the plating load from said pulsed a-c a rectified pulsed d-c having a preselected d-c amplitude and a preselected pulsed d-c frequency, said pulsed d-c frequency being greater than that of said preselected a-c frequency, said high frequency rectifier means comprising a high frequency step down power transformer and a pair of high speed diodes, said power transformer and said high speed diodes providing said pulsed d-c with an amplitude substantially less than that of said pulsed a-c, an a-c bus electrically transmitting said pulsed a-c to the input of said high frequency rectifier means whereby the inductive and resistive effects of said a-c bus are minimized.

6. The system of claim 5 with said preselected a-c frequency being in a range of from around 300 Hz to around 3000 Hz.

7. The system of claim 5 with said pulsed d-c having an amplitude in a range of from around 2 volts to around 5 volts.

8. The system of claim 5 with said pulsed d-c having an amplitude in a range of from around 2 volts to around 5 volts when said pulsed a-c has a peak amplitude in a range of from around 150 volts to around 550 volts.

9. The system of claim 5 with said a-c bus having lines of opposite polarity and being of a gauge permitting twisting together providing for a reduced inductive effect.

10. In an industrial system providing from a relatively high voltage, sixty cycle, three phase a-c source a relatively low voltage pulsed d-c delivering a current having an amplitude in excess of around 1,000 amperes to a load, the invention comprising: controlled rectifier means electrically connected to the a-c source for providing therefrom a rectified d-c output voltage of a preselected high amplitude, inverter means electrically connected to said controlled rectifier means and situated at substantially the same physical location for providing pulsed a-c of a preselected width and preselected a-c frequency, with said preselected a-c frequency being in a range of from around 300 Hz to around 3000 Hz, high frequency rectifier means located at the plating load and electrically connected to said inverter means for providing from said pulsed a-c a rectified pulsed d-c having a preselected d-c amplitude and a preselected pulsed d-c frequency, said pulsed d-c frequency being twice that of said preselected a-c frequency, said high frequency rectifier means comprising a high frequency step down power transformer and a pair of high speed diodes such that where said pulsed a-c has a peak amplitude in a range of from around 150 volts to around 550 volts said power transformer and said high speed diodes provide said pulsed d-c having an amplitude in a range of from around 2 volts to around 50 volts, an a-c bus having lines of opposite polarity electrically transmitting said pulsed a-c to the input of said high frequency rectifier means with said a-c bus being of a gauge whereby the inductive and resistive effects of said a-c bus can be minimized.

* * * * *